June 7, 1955  A. STUMVOLL ET AL  2,709,866
DECOY ANCHOR
Filed June 23, 1952  2 Sheets-Sheet 1

INVENTORS
Anton Stumvoll
Arnold R. Johnson
BY Victor J. Evans & Co.
ATTORNEYS

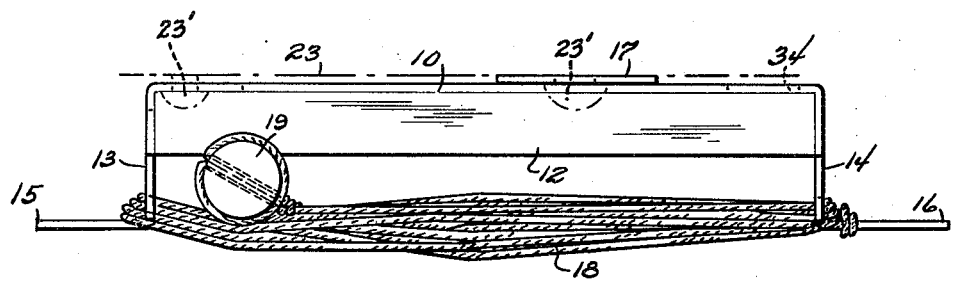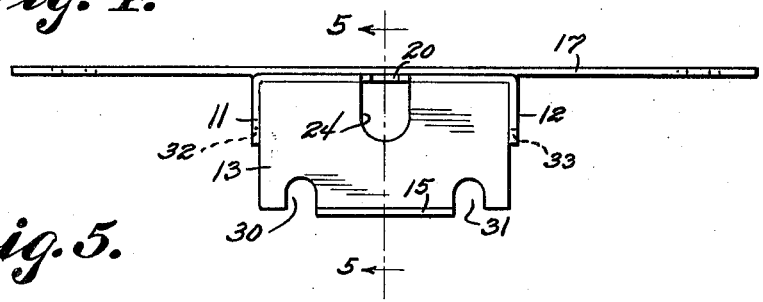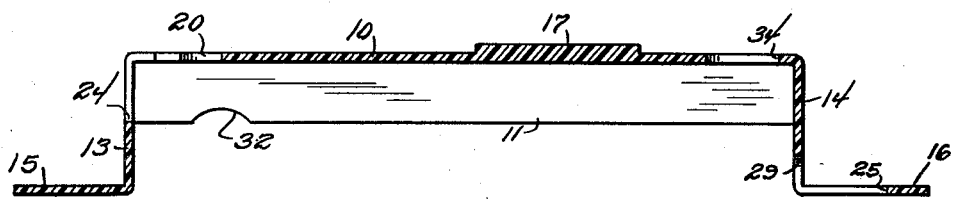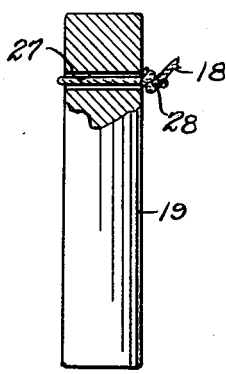

United States Patent Office 2,709,866
Patented June 7, 1955

2,709,866

DECOY ANCHOR

Anton Stumvoll, Cole Harbor, and Arnold R. Johnson, Underwood, N. Dak.; said Stumvoll assignor to said Johnson Application June 23, 1952, Serial No. 295,064

2 Claims. (Cl. 43—3)

This invention relates to devices for retaining decoys in position on the water, and in particular a frame adapted to be secured to the base of a decoy and in which the frame is provided with projections to facilitate winding a line with a weight on the extended end thereof thereon.

The purpose of this invention is to provide means for attaching a weight line to a decoy whereby the decoy will ride in substantially an upright position in rough weather.

Various types of anchoring devices have been provided for decoys, however, where devices of this type are attached to the decoy at a point adjacent the head or at different points on the body of the decoy the head of the decoy is drawn downwardly into the water in rough weather and in some instances the decoy is turned over. With this thought in mind this invention contemplates a frame wherein a line is secured to an attachment secured on the lower side of the decoy wherein the line is spaced from the body of the decoy and wherein the length of the line is readily adjustable.

The object of this invention is, therefore, to provide means for attaching an anchor line to a decoy without unnecessarily drawing the decoy downwardly into the water in rough weather.

Another object of the invention is to provide an attachment for securing an anchor line to a decoy in which the attachment is so formed that the line may be wrapped thereon when not in use.

A further object of the invention is to provide an anchor line attachment for a decoy in which the attachment is of a simple and economical construction.

With these and other objects and advantages in view the invention embodies a frame having a substantially rectangular shaped intermediate section with line carrying flanges extended from the ends thereof and with a transversely disposed member having screw receiving slots therein on the upper surface.

Other features and advantages of the invention will appear from the following description taken in connection with the drawings, wherein:

Figure 3 is a side elevational view of the attachment illustrating the device with a line wrapped thereon and showing the lower surface of a decoy in dot and dash lines.

Figure 4 is an end elevational view of the attachment.

Figure 5 is a longitudinal section through the attachment taken on line 5—5 of Fig. 4 showing the device with the line and weight removed.

Figure 6 is a detail illustrating a weight adapted to be used with the attachment and showing part of the weight broken away and shown in section.

Figure 1:
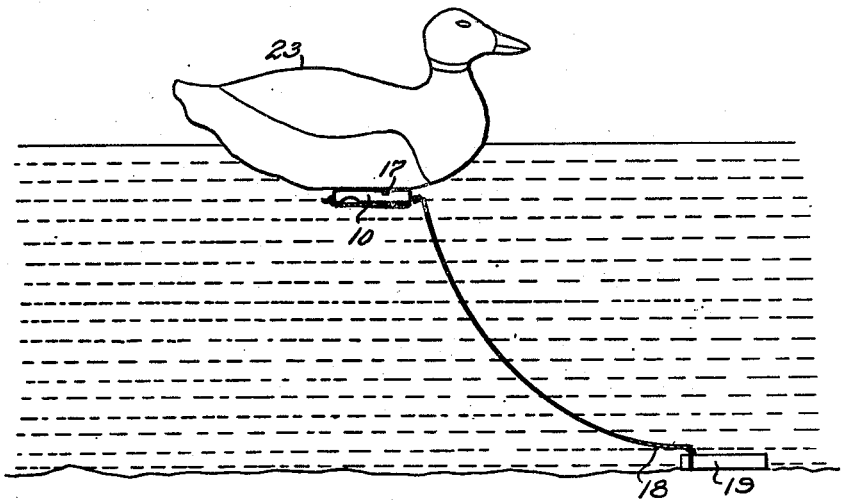
Figure 1 is an elevational view illustrating the application of the device to a decoy with the decoy floating on water and with a weight attached to the decoy by a line extended from the attachment.

Referring now to the drawings wherein like reference characters denote corresponding parts the improved anchor, string carrier and control attachment of this invention includes a frame having an upper plate 10 provided with side flanges 11 and 12, end walls 13 and 14 with tabs 15 and 16, respectively extended from the lower ends thereof, a cross bar 17 and a line 18 with a weight 19 secured to the end thereof.

The plate 10 is provided with a keyhole slot 20 at one end and similar slots 21 and 22, which are formed with enlarged inner ends are provided in the ends of the cross bar 17. By this means screws 23' may be positioned in the base of a decoy, as indicated by the numeral 23 and the plate with the cross bar thereon may be positioned over the heads of the screws with the screws extended into the slots.

The end wall 13 is provided with a notch 24 therein that communicates with the slot 20 whereby the head of a screw may pass through the end wall and into the slot.

Figure 2:
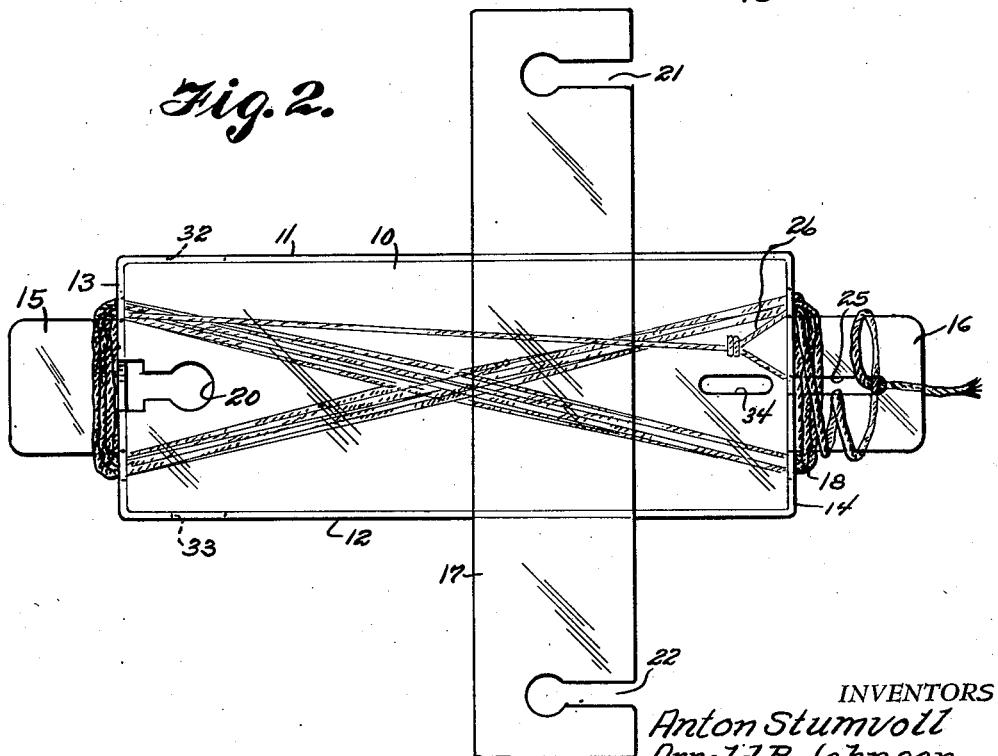
Figure 2 is a plan view showing the frame of the attachment.

The tab 16 which extends from the end wall 14 is provided with an elongated slot 25 therein through which the weight attaching line 18 extends, as illustrated in Fig. 2 and with the line wrapped over the tab and extended through the slot, as shown in Fig. 2 it will be gripped in different positions whereby the length thereof is readily adjustable.

One end of the line is tied to form a loop 26 which extends through the slot 25 and around one portion of the tab 16 and the opposite end extends through an opening 27 in the weight 19 with the end of the line tied at the point 28 forming a knot.

The end wall 14 is provided with a notch 29 which communicates with the slot 25 to facilitate tieing the line to the attachment and the end walls may also be provided with notches 30 and 31 which facilitate wrapipng the line over the tabs.

The lower edges of the flanges 11 and 12 are provided with recesses 32 and 33 in which the ends of the weight 19 nest with the line wrapped around the attachment, as illustrated in Fig. 3.

With the attachment secured to the under surface of the decoy at a point substantially in the center or midway between the head and tail the decoy will not be continuously diving or dipping the head into the water when riding waves or in rough weather.

In some types of safety decoys the decoys are inflated by air and these decoys are provided with an anchor line attaching eye or loop which extends from the forward end of the body, and for this use the upper plate 10 of the device is provided with a slot 34 that is positioned to receive the loop or eye.

With this type of decoy the inflating connection extends through the opening 20.

It is preferred to form the attachment of transparent plastic material although it will be understood that the device may be made of other suitable material.

When not in use the line is wrapped around the frame extending over the tabs at the ends and through the notches 30 and 31 whereby a comparatively neat package is provided and with the weight nested in the recesses 32 and 33 the end of the line is not continuously hanging from the device.

It will be understood that modifications within the scope of the appended claims may be made in the device without departing from the spirit of the invention.

What is claimed is:

1. In a decoy anchor attachment, the combination which comprises an elongated substantially rectangular shaped frame having an upper plate with a transversely disposed cross bar secured thereto and having vertically disposed end walls with tabs extended from the lower ends of the end walls, said upper plate and cross bar having mounting slots therein and one of said tabs having a line locking slot therein, a line secured in said line locking slot, and a weight secured to the end of the line, said upper plate having depending flanges at the sides, and said depending flanges having arcuate weight receiving recesses in the lower edges thereof.

2. In a decoy anchor attachment, the combination which comprises a frame having an upper plate with a cross bar secured thereto and having end walls with tabs extended from the ends of the end walls, said upper plate and cross bar having mounting slots therein and one of said tabs having a line locking slot therein, a line secured in said line locking slot, and a weight secured to the end of the line, said upper plate having depending flanges, and said depending flanges having arcuate weight receiving recesses in the lower edges thereof.

References Cited in the file of this patent

UNITED STATES PATENTS

| | | |
|---|---|---|
| 122,692 | Wood | Jan. 9, 1872 |
| 1,444,342 | Godward | Feb. 6, 1923 |
| 2,256,616 | Johnson et al. | Sept. 23, 1941 |
| 2,368,834 | Higgins | Feb. 6, 1945 |
| 2,469,443 | Reiter | May 10, 1949 |

FOREIGN PATENTS

| | | |
|---|---|---|
| 124,973 | Germany | Oct. 26, 1931 |